United States Patent [19]

Bodin et al.

[11] Patent Number: 5,413,365
[45] Date of Patent: May 9, 1995

[54] WHEEL SPINDLE

[75] Inventors: Jan-Olof Bodin, Alingsås; Ingemar Dagh, Hisingsbacka, both of Sweden

[73] Assignee: AB Volvo, Gothenburg, Sweden

[21] Appl. No.: 78,186

[22] PCT Filed: Dec. 17, 1991

[86] PCT No.: PCT/SE91/00869
  § 371 Date: Oct. 13, 1993
  § 102(e) Date: Oct. 13, 1993

[87] PCT Pub. No.: WO92/11154
  PCT Pub. Date: Jul. 9, 1992

[51] Int. Cl.⁶ ............................................. B60G 25/00
[52] U.S. Cl. ..................................... 280/96.1; 280/93
[58] Field of Search ...................... 280/96.1, 95.1, 93

[56] References Cited

U.S. PATENT DOCUMENTS

| 854,451 | 5/1907 | Bideau | 280/96.1 |
| 1,471,575 | 10/1923 | Simons | 280/96.1 |
| 1,637,089 | 7/1927 | Perrot | 280/95.1 |
| 1,783,614 | 12/1930 | Griswold | 188/71.1 |
| 2,094,945 | 10/1937 | Hesselrode | 188/71.1 |
| 2,206,216 | 7/1940 | Ash | 280/96.1 |
| 2,242,048 | 5/1941 | Ash | 280/96.1 |
| 2,268,329 | 12/1941 | Ash | 280/96.1 |
| 2,270,919 | 1/1942 | Ash | 280/96.1 |
| 3,441,288 | 4/1969 | Boughner | 188/71.1 |
| 4,047,598 | 9/1977 | Thrower | 188/71.1 |
| 4,553,624 | 11/1985 | Yoshii | 280/96.1 |
| 4,798,394 | 1/1989 | Pollock et al. | 280/96.1 |
| 5,018,757 | 5/1991 | Kozuka | 280/96.1 |

FOREIGN PATENT DOCUMENTS

| 0259338 | 1/1968 | Austria | 280/93 |
| 0520121 | 12/1992 | European Pat. Off. | 280/96.1 |

Primary Examiner—Margaret A. Focarino
Assistant Examiner—Christopher P. Ellis
Attorney, Agent, or Firm—Young & Thompson

[57] ABSTRACT

Steering knuckle with disk brake for a steerable vehicle wheel. The steering knuckle (3) has a king pin bearing arrangement in the form of a lower thrust and radial bearing (22) and an upper radial bearing (25). The upper extent of the king pin (10) and the radial bearing lies essentially co-planar with the upper side of the knuckle in order to make it possible to place the disk brake yoke (5) above the king pin (10).

9 Claims, 4 Drawing Sheets

WHEEL SPINDLE

FIELD OF THE INVENTION

The present invention relates to a steering knuckle device for a non-driven steerable vehicle wheel for motor vehicles, comprising a knuckle unit with upper and lower axially spaced and axially aligned bores for rotatable mounting of a king pin and with means disposed to support a brake yoke for a disk brake and a stub axle unit which is joined to the knuckle unit and on which a wheel hub is designed to be mounted.

BACKGROUND OF THE INVENTION

Brake yokes for disk brakes are usually fixed asymmetrically on the steering knuckle relative to the swing axis of the knuckle, e.g. at the "rear edge" of the disk. The reason for this is there is often no space above the disk in order to mount the brake yoke directly above the axis of rotation of the knuckle. The disadvantage of an asymmetric placement is not significant for lighter brakes, e.g. disk brakes for passenger cars, but the heavier the vehicle is, the heavier the entire brake equipment will be and the heavier the brake yoke will be. In the heaviest class of trucks the brake yokes will be so heavy that placement of a brake yoke at the rear edge of the brake disk for example would involve significant problems with installation and service, since the yoke must be held up while its screws are inserted into the mounting flanges on the steering knuckle. In the heavier class of vehicles, the king pin is traditionally mounted in an upper thrust bearing which is built-up vertically and limits the space so that the brake yoke cannot be given the ideal placement.

SUMMARY OF THE INVENTION

The purpose of the present invention is to achieve a steering knuckle device of the type described by way of introduction which is arranged so that the brake yoke can be placed at the upper edge of the disk, e.g. above the axis of rotation of the steering knuckle to thereby, inter alia facilitate installation and service.

This is achieved according to the invention by virtue of the fact that the king pin is so mounted in the upper bore in bearing means for absorbing at least radial forces, that its upper end with associated bearing means lies essentially co-planar with or below the upper edge of the bore, and that the king pin is mounted in the lower bore in a bearing or a bearing combination disposed to absorb both axial and radial forces and that the brake yoke is arranged so that at least a portion thereof lies above the upper end of the king pin. By absorbing, in contrast to present practice, axial forces on the king pin at the lower bearing, it has proved possible to reduce the height of the bearing so much that a brake yoke can be placed directly above the king pin. Installation of the yoke is thereby facilitated appreciably. It is sufficient to bring down the yoke from above so that it straddles the disk. The yoke thus rests in place without any need for extra support when inserting the screws into the mounting flanges.

BRIEF DESCRIPTION OF THE DRAWINGS

The invention will be described below in more detail with reference to examples shown in the accompanying drawings, where.

DESCRIPTION OF THE PREFERRED EMBODIMENTS

Figure 1:
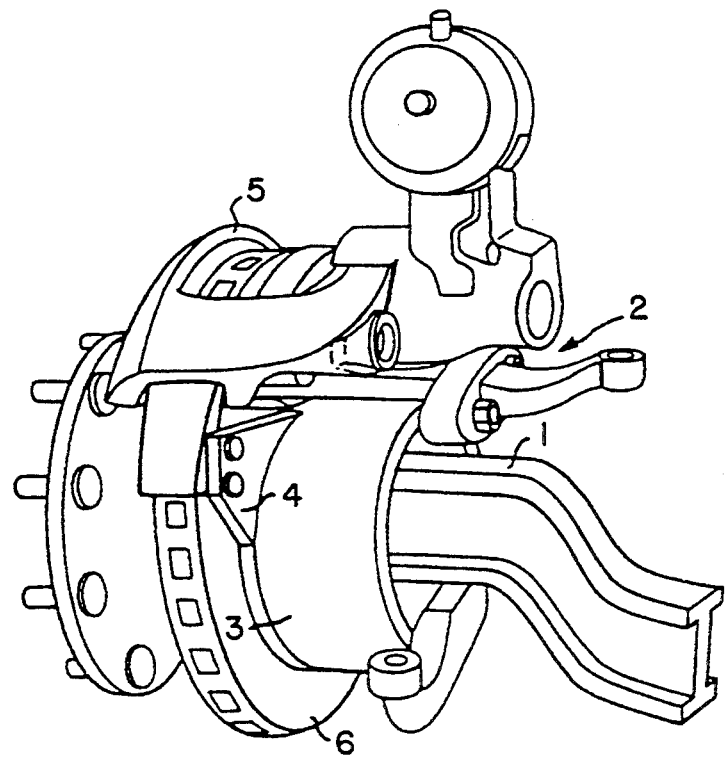
FIG. 1 shows a schematic prospective view of one embodiment of a steering knuckle device according to the invention.

In FIG. 1, 1 designates the distal end of a rigid front axle of a truck. The end of the axle is joined to a king pin which is mounted in bearings in a steering knuckle with the general designation 2, in a manner which will be described below with reference to FIG. 3. The steering knuckle 2 comprises a knuckle unit 3 with a pair of mounting flanges 4 (one shown) mounted symmetrically relative to the axis of rotation of the knuckle and to which a brake yoke 5 is mounted. The yoke 5 straddles a brake disk 6 which is non-rotatably joined to a wheel hub (see FIG. 3).

Figure 2:
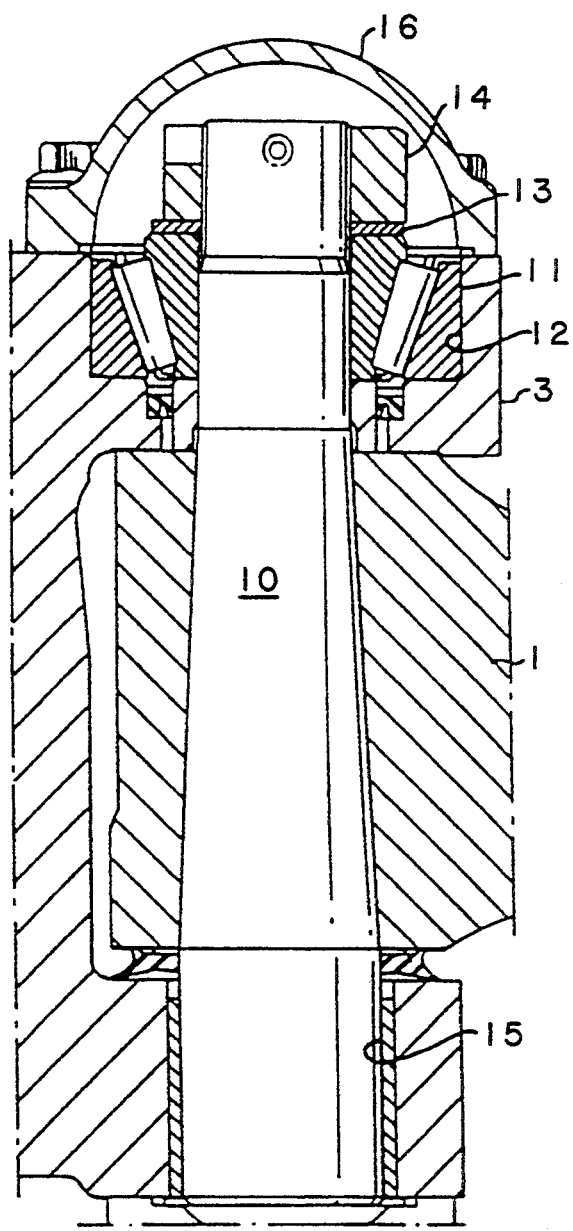
FIG. 2 shows a longitudinal section through a conventional king pin bearing.

FIG. 2 shows conventional king pins bearings. A king pin 10 is mounted in a taper roller bearing 11, which is held in an upper bore 12 in the knuckle unit 3. The king pin 10 is fixed axially against the bearing by means of a washer 13 and a crown nut 14 and thus hangs in the bearing 11. At its lower end the king pin is mounted in a journal bearing 15.

The upper bearing 11 and the end of the king pin with the crown nut 14 are covered by a hemispherical cover 16. As can be seen in the Figure, this arrangement requires that the king pin extend relatively far above the upper surface of the knuckle unit 3. In fact, this arrangement makes symmetrical placement of a brake yoke above the king pin impossible.

Figure 3:
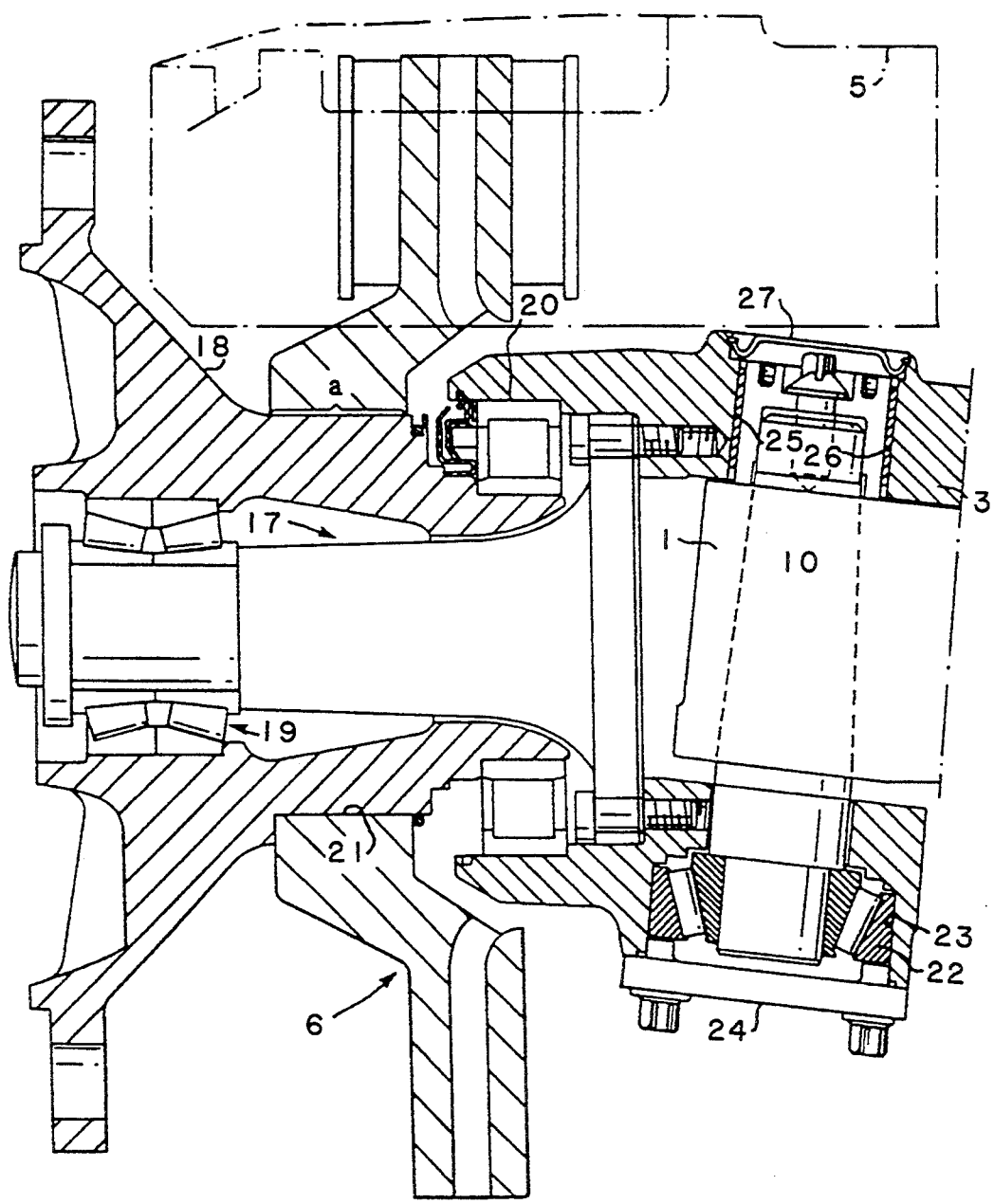
FIG. 3 shows a longitudinal section through a steering knuckle device corresponding to that in FIG. 1

FIG. 3 shows a knuckle device 2 according to the invention in greater detail.

In addition to the knuckle unit 3 it comprises a stub axle 17 which is a separate unit screwed securely to the unit 3.

A hub 18 is mounted on the stub axle 17 in distal and proximal bearings 19 and 20 respectively. The brake disk 6 is non-rotatably mounted on the hub. For this purpose the hub has a portion "a" with a polygonal outer cross-sectional profile and the brake disk 6 has a central opening 21 with a corresponding profile.

As can be seen in FIG. 3, the king pin bearing arrangement of the steering knuckle according to the invention is reversed in respect to the known bearing arrangement (FIG. 2). A taper roller bearing 22 is housed in a lower bore 23 in the knuckle unit 3. The bearing 22 rests against a cover 24 which has been screwed securely to the underside of the knuckle unit.

Figure 4:
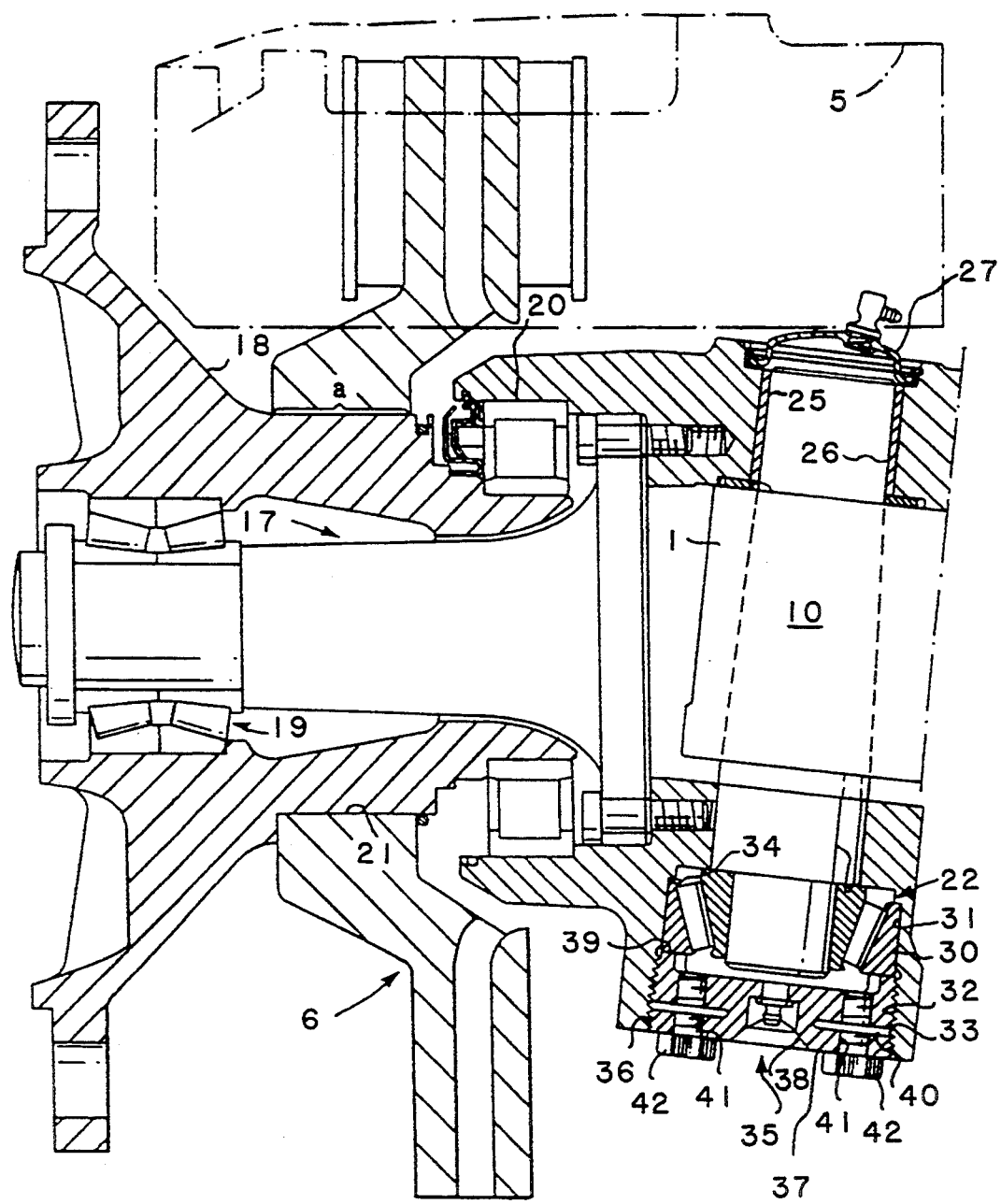
FIG. 4 shows a longitudinal section corresponding to FIG. 3 through an additional embodiment of the steering knuckle device.

A radial bearing 25 is disposed in an upper bore 26, which is covered by a flat cover 27. By, in this manner, reversing the positions of the king pin bearings, the king pin 10 can be lowered and the hemispherical cover 16 above the king pin (FIG. 2) can be eliminated. This makes it possible to place the brake yoke 5 symmetrically with regard to the king pin, as is indicated with dash-dot line in FIG. 3, and this significantly facilitates installation and service, among other advantages. FIG. 4 shows an additional embodiment of the steering knuckle device, where components corresponding to those in FIG. 3 have been given the same reference numerals as in FIG. 3.

The outer ring 30 of the taper roller bearing 22 is pressed into the lower downwardly opening bore, which in this example has an upper portion 31 with a smooth interior surface and a lower portion 32 of larger diameter than the portion 31 and with an inner surface which is threaded 33.

The outer ring 30 of the bearing 22 is pressed with its upper surface against a shoulder 34 in the upper smooth portion 31 of the bore by a securing element 35 in the form of a cylindrical disk 37 provided with an external thread 36 and a central profile cavity 38 for engagement with a tool, e.g. a torque wrench. The disk 37 is screwed into the threaded portion 32 with a tightening torque which provides the axial pressure exerted by the outer ring 30 against the shoulder 34. The outer ring of the bearing abut against an annular ridge 39 on the upwardly facing surface of the disk 37.

The disk 37 is made with a slot 40 disposed in a radial plane, which divides the thread 30 of the disk in two parts. Two threaded bores 41 extended through the disks 37 at its slotted portion. A screw 42 is screwed into each bore 41 to tension the parts of the disk separated by the slot 40 and thus achieve tension in the thread 33 of the bore 32 in order to lock the securing element 35 in the bore 32.

This design provides with simple means the desired tension in the lower bearing.

The invention has been described above with reference to an example in which the brake yoke is arranged symmetrically relative to the king pin. It is of course also possible to displace the king pin from the plane of symmetry. The central feature of the king pin arrangement described is that, as needed, a greater or lesser portion of the brake yoke can extend over the upper end of the king pin.

We claim:

1. Steering knuckle device for a non-driven steerable vehicle wheel for motor vehicles, comprising a knuckle unit with upper and lower axially spaced and axially aligned bores for rotatable mounting of a king pin having a conical portion supported in a conical bore in a wheel axle and with supporting means disposed to support a brake yoke for a disk brake and a stub axle unit which is joined to the knuckle unit and on which a wheel hub is adapted to be mounted, wherein said king pin is so mounted in the upper bore in first bearing means for absorbing at least radial forces, and said king pin's upper end with said associated first bearing means lies essentially co-planar with or below an upper edge of the upper bore, said king pin being mounted in a lower bore in second bearing means disposed to absorb both axial and radial forces, and said brake yoke being arranged so that at least a portion thereof lies above the upper end of the king pin.

2. Steering knuckle device according to claim 1, wherein the second bearing means are pretensioned axially by an externally threaded securing element screwed into a thread in said lower bore.

3. Steering knuckle device according to claim 2, wherein the securing element has locking means for locking the securing element against rotation in the lower bore.

4. Steering knuckle device according to claim 2, wherein the securing element is formed of a cylindrical disk, which has a radial slot, which extends from a threaded periphery of the disk and a certain distance radially inward, at least one threaded bore extends axially through the slot from a downwardly facing surface of the disk, and a screw is screwed into said lower bore to tension thread portions separated from each other by the slot against each other.

5. Knuckle device according to claim 2, wherein the securing element is provided on its downwardly facing surface with a profile cavity for engagement with a tool.

6. Knuckle device according to claim 2, wherein the second bearing means are formed by a taper roller bearing having an outer ring which is tensioned against an abutment surface in the lower bore of the knuckle unit by an annular ridge at a radially outer portion of the securing element, and the king pin has an abutment surface bearing against an inner ring of the taper roller bearing.

7. Knuckle device according to claim 1, wherein the supporting means for the brake yoke comprise flange means provided with bores for securing said brake yoke thereto by means of screws.

8. Knuckle device according to claim 7, wherein the flange means comprise a pair of mounting flanges arranged on either side of the upper bore as seen in the rotational plane of the wheel, for fixing the brake yoke in a position above the upper bore.

9. Steering knuckle device according to claim 7, wherein the brake yoke is fixed symmetrically relative to the king pin.

* * * * *